US008427493B2

(12) United States Patent
Duluk, Jr. et al.

(10) Patent No.: US 8,427,493 B2
(45) Date of Patent: Apr. 23, 2013

(54) DRAW COMMANDS WITH BUILT-IN BEGIN/END

(75) Inventors: Jerome F. Duluk, Jr., Palo Alto, CA (US); Thomas Roell, Denver, CO (US)

(73) Assignee: NVIDIA Corporation, Santa Clara, CA (US)

( * ) Notice: Subject to any disclaimer, the term of this patent is extended or adjusted under 35 U.S.C. 154(b) by 232 days.

(21) Appl. No.: 12/893,617

(22) Filed: Sep. 29, 2010

(65) Prior Publication Data

US 2011/0084975 A1    Apr. 14, 2011

Related U.S. Application Data

(60) Provisional application No. 61/251,265, filed on Oct. 13, 2009.

(51) Int. Cl.
 *G06T 1/60*     (2006.01)
(52) U.S. Cl.
 USPC ........................................ 345/522; 345/501
(58) Field of Classification Search .................. None
 See application file for complete search history.

(56) References Cited

U.S. PATENT DOCUMENTS

| 5,315,698 A * | 5/1994 | Case et al. ................... 345/522 |
| 6,323,867 B1 * | 11/2001 | Nookala et al. ............... 345/522 |
| 6,362,825 B1 * | 3/2002 | Johnson ........................ 345/522 |
| 6,469,704 B1 * | 10/2002 | Johnson ........................ 345/553 |
| 6,631,423 B1 * | 10/2003 | Brown et al. ................. 719/323 |
| 7,170,512 B2 * | 1/2007 | Southwell et al. ............ 345/420 |
| 2010/0007662 A1 * | 1/2010 | Cox et al. ...................... 345/420 |

* cited by examiner

*Primary Examiner* — Xiao M. Wu
*Assistant Examiner* — Aimee Joshua
(74) *Attorney, Agent, or Firm* — Patterson & Sheridan, LLP

(57) ABSTRACT

One embodiment of the present invention sets forth a technique for reducing the overhead for transmitting explicit begin and explicit end commands that are needed in primitive draw command sequences. A draw method includes a header to specify an implicit begin command, an implicit end command, and instancing information for a primitive draw command sequence. The header is followed by a packet including one or more data words (dwords) that each specify a primitive topology, starting offset into a vertex or index buffer, and vertex or index count. Only a single clock cycle is consumed to transmit and process the header. The performance of graphics application programs that have many small batches of geometry (as is typical of many workstation applications) may be improved since the overhead of transmitting and processing the explicit begin and explicit end draw commands is reduced.

20 Claims, 12 Drawing Sheets

US 8,427,493 B2

DRAW COMMANDS WITH BUILT-IN BEGIN/END

CROSS-REFERENCE TO RELATED APPLICATIONS

This application claims priority benefit to United States provisional patent application titled, "Draw Commands With Built-In Begin/End," filed on Oct. 13, 2009 and having Ser. No. 61/251,265.

BACKGROUND OF THE INVENTION

1. Field of the Invention

Embodiments of the invention relate generally to draw commands for graphics, and more specifically to draw commands with an implicit begin and an implicit end.

2. Description of the Related Art

In a conventional graphics processing the OpenGL applications programming interface (API) includes an explicit API-visible begin and end for draw commands. Primitive draw commands are placed between a pair of begin and end draw commands to cause a graphics processor to render primitives. When a small number of primitive draw commands are placed between a pair of begin and end draw commands, the overhead of reading and the clock cycles spent processing the begin and end draw commands may reduce the primitive processing throughput. For example, when only two primitive draw commands are placed between a pair of begin and end draw commands, four clock cycles are needed to transmit and process the command sequence (one for begin, one for end, and two for the primitive draw commands). Four clock cycles are needed to transmit and process the two primitive draw commands, so there are two clock cycles of overhead and two clock cycles of draw command processing.

Accordingly, what is needed in the art is a technique for reducing the overhead for transmitting the begin and end draw commands that are needed in primitive draw command sequences.

SUMMARY OF THE INVENTION

A system and method of reducing the overhead for transmitting the begin and end draw commands that are needed in primitive draw command sequences use a draw method that includes an implicit begin command and an implicit end command. The performance of graphics application programs that have many small batches of geometry (as is typical of many workstation applications) may be improved since the overhead of transmitting and processing the explicit begin and explicit end commands is reduced when the draw method is used. The draw method includes a header to specify the begin command, end command, and instancing information in a single data word (dword). The header is followed by a packet including one or more dwords that each specify a primitive topology, starting offset into a vertex or index buffer, and a vertex or index count. Only a single clock cycle is consumed to transmit and process the header and a single clock cycle is consumed to transmit and process each dword following the header.

Various embodiments of a method of the invention for processing a sequence of primitive draw commands, include determining that the sequence of primitive draw commands includes an implicit begin command and an implicit end command and extracting a primitive topology, a first index buffer parameter, and an index count parameter corresponding to a primitive from the sequence of primitive draw commands. A set of indices corresponding to the primitive is read from locations in an index buffer based on the first index buffer parameter and the index count parameter and rendering of the primitive is initiated using vertex data associated with the set of indices.

Various embodiments of the invention include a system for processing a sequence of primitive draw commands. The system includes a front end that is configured to determine that the sequence of primitive draw commands includes an implicit begin command and an implicit end command and extract a primitive topology, a first index buffer parameter, and an index count parameter corresponding to a primitive from the sequence of primitive draw commands. A set of indices corresponding to the primitive is read from locations in an index buffer based on the first index buffer parameter and the index count parameter and rendering of the primitive is initiated using vertex data associated with the set of indices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
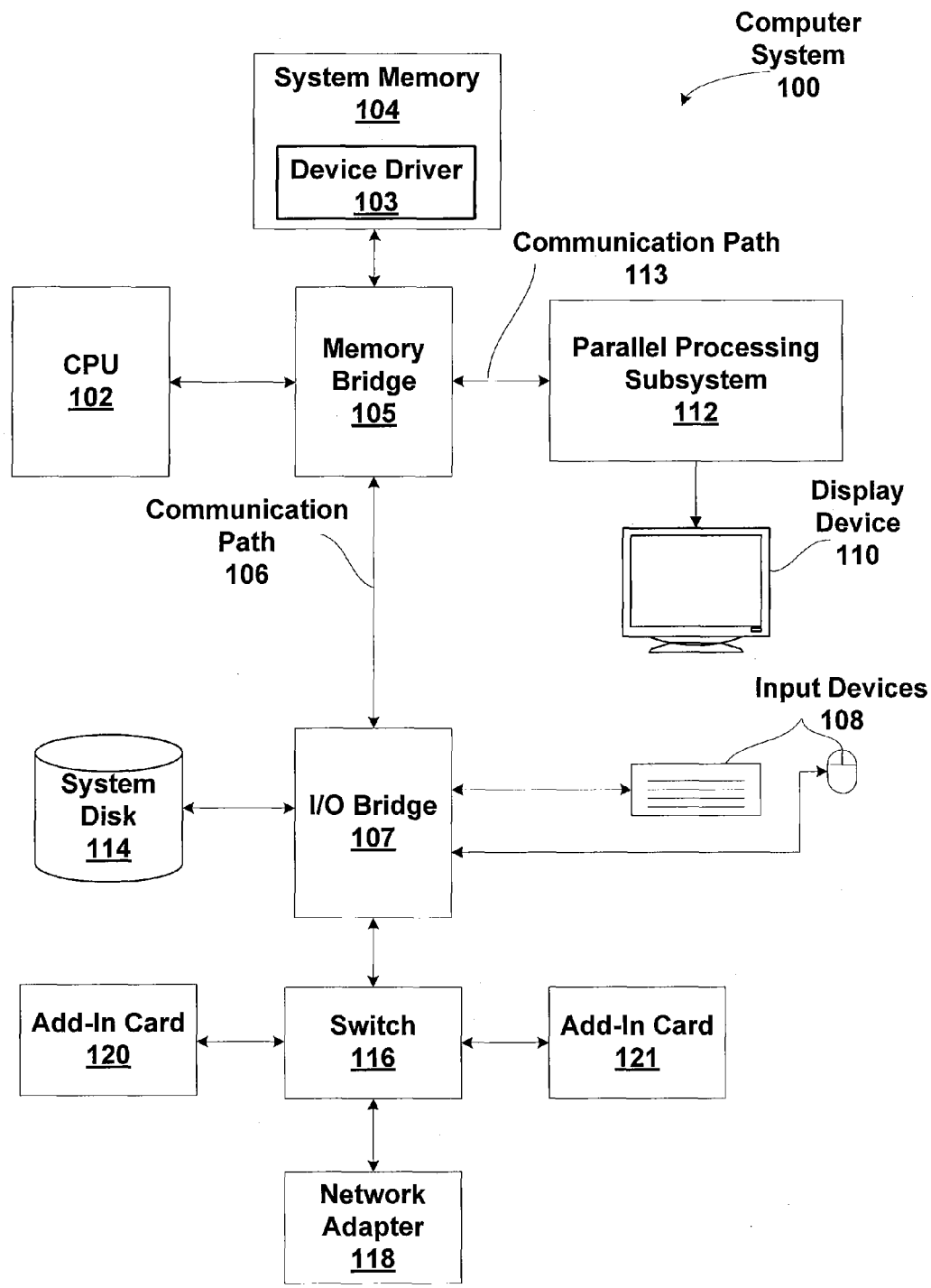
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
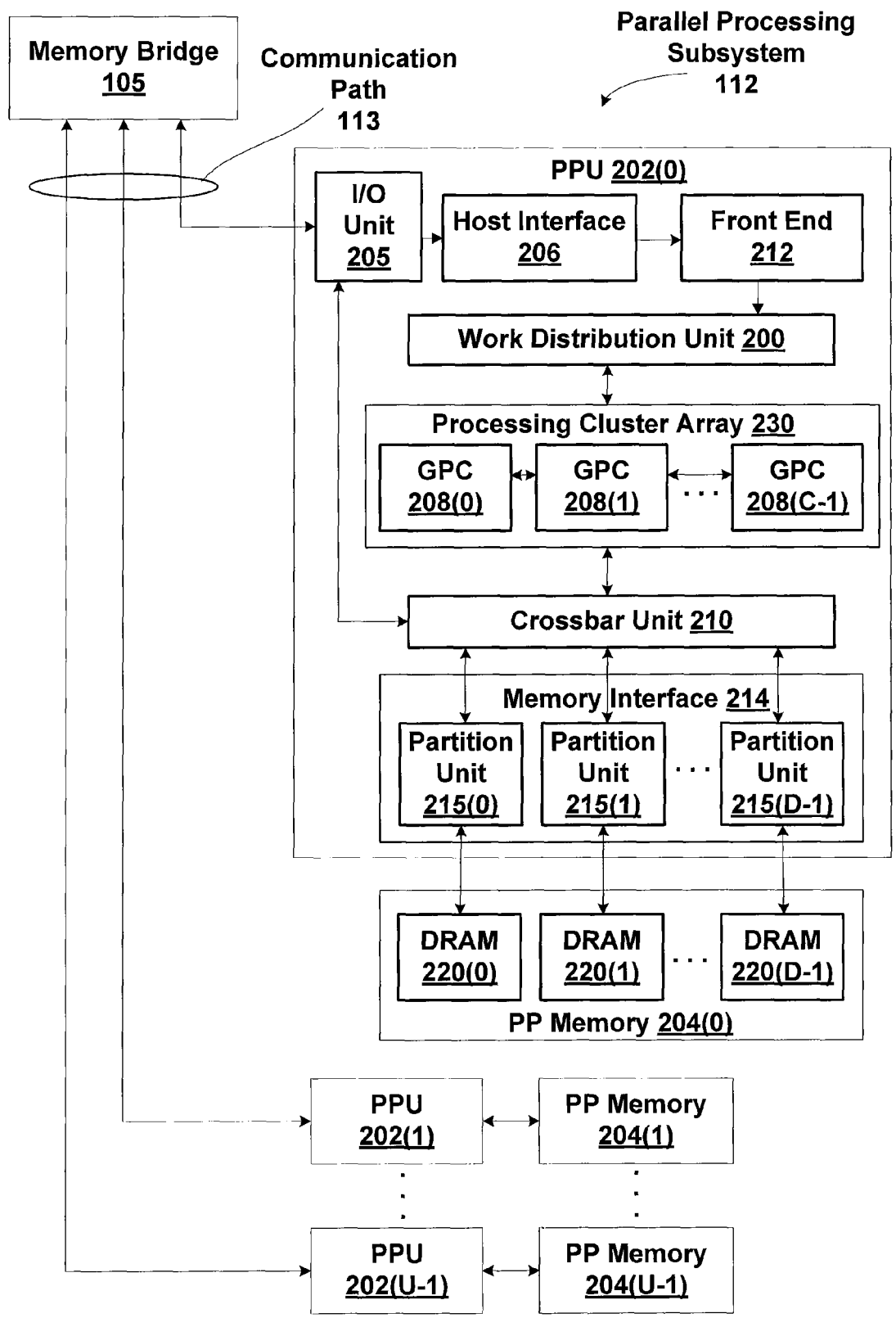
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device (s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≧1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
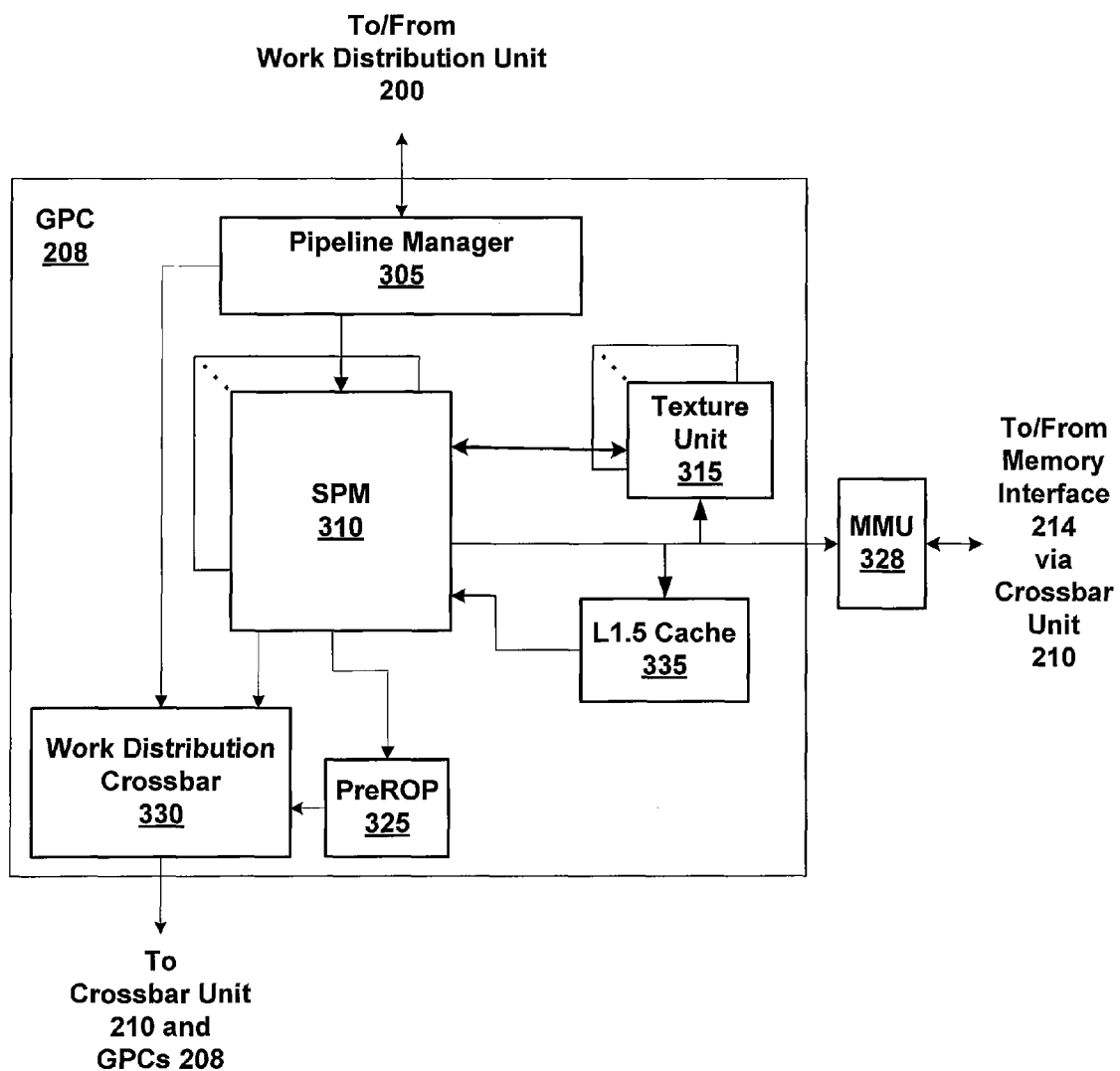
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
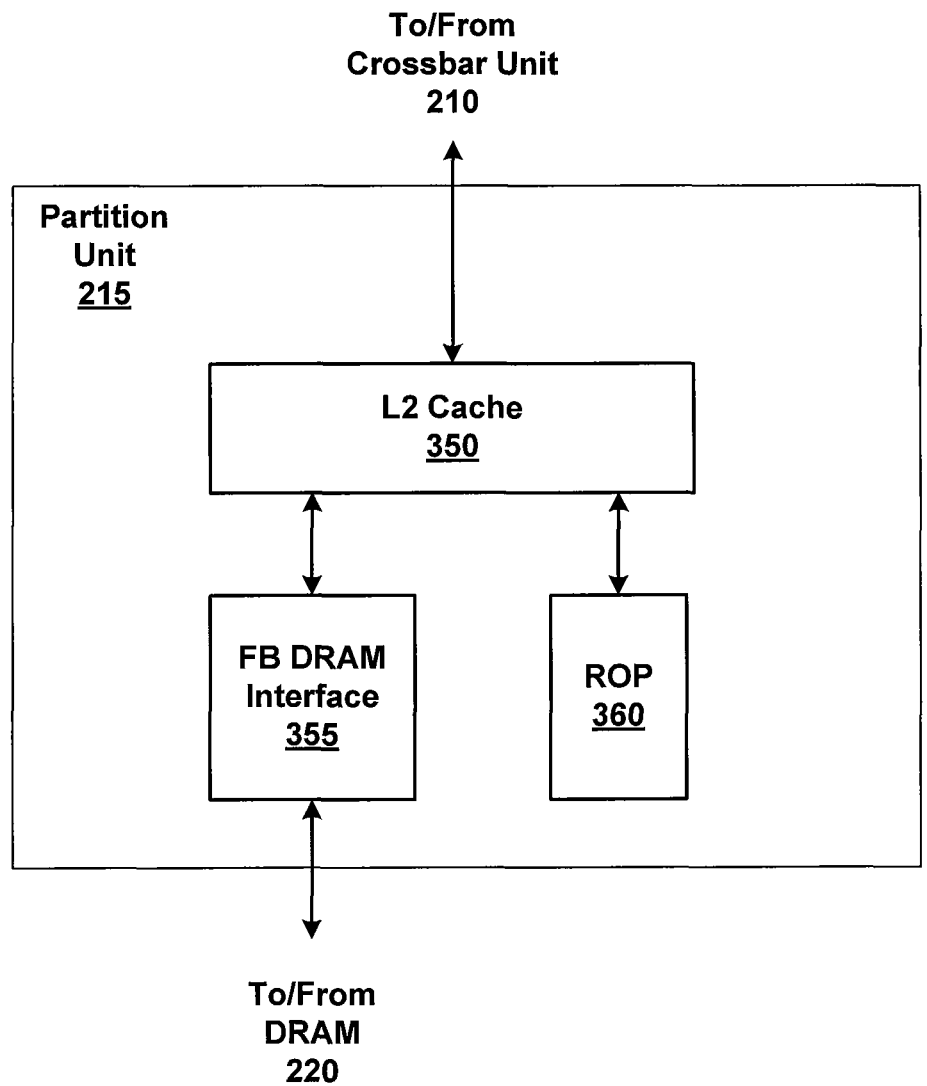
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
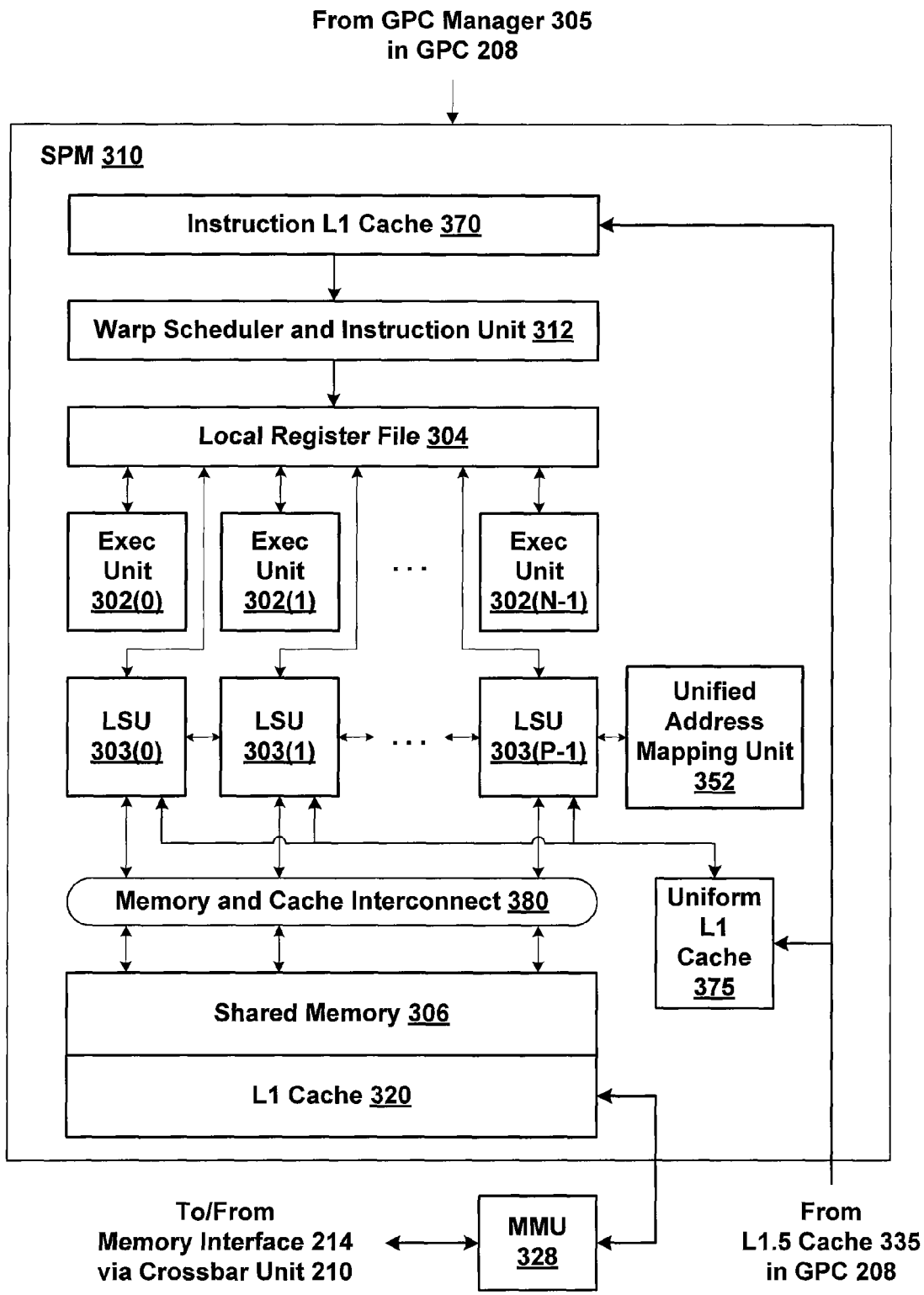
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Figure 4:
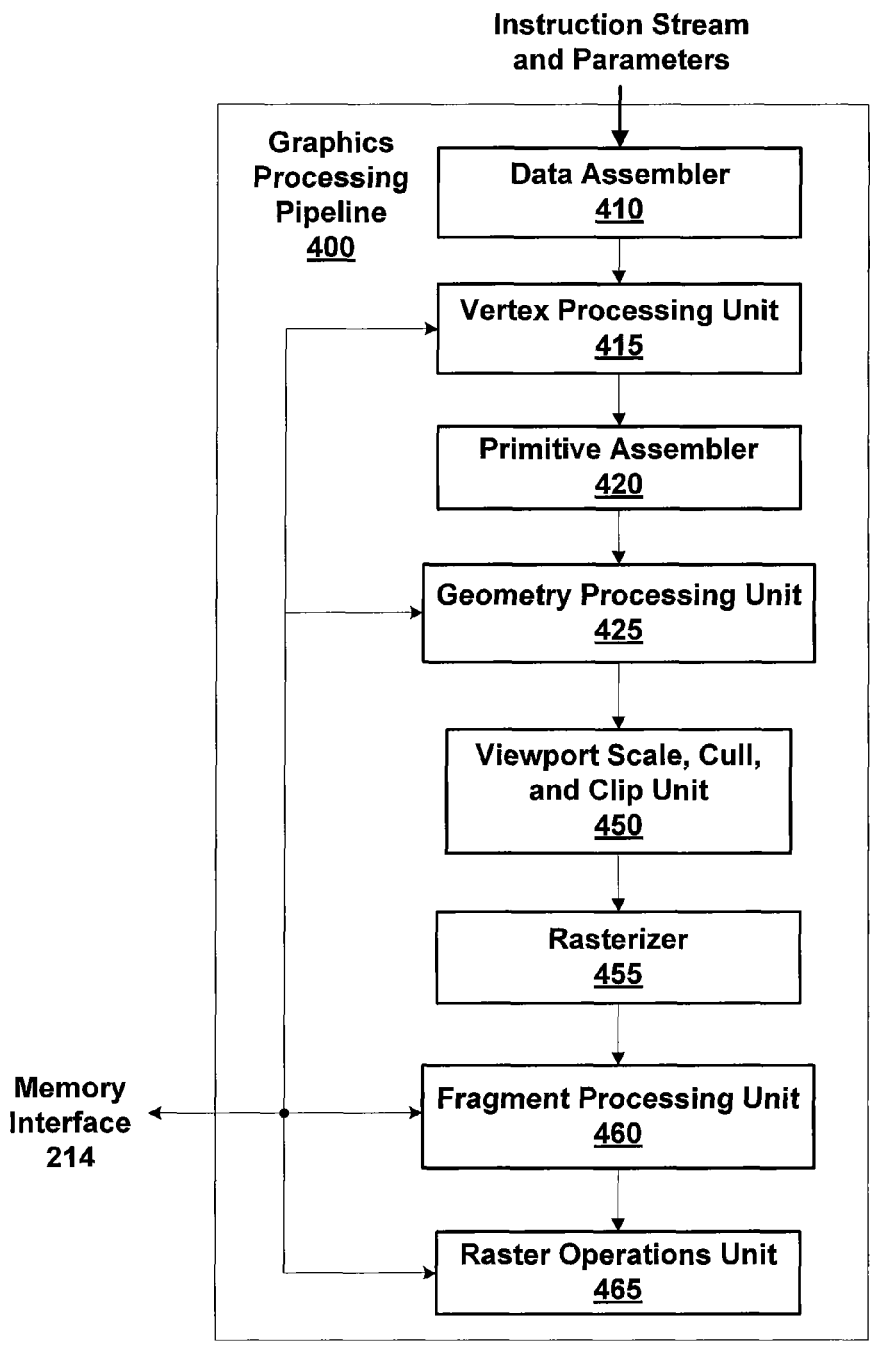
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Draw Commands with Built-In Begin/End

A pushbuffer is an instruction stream and parameters that can include command sequences. In some embodiments, a command comprises a header and data, where the header is 32-bit dword and the data is a 32-bit dword. A header specifies a particular command, and may be associated with multiple data dwords, and also associated with a Cnt field within the header may specify the number of times that the same command or sequentially adjacent commands are executed. Different command tags (NoIncr, Incr, and IncrOnce) may be included within the header to indicate whether the same command, sequential commands, or a first command and multiple second commands are executed. A NoIncr command tag within the header indicates the same command is executed Cnt times. A set of commands that are often executed in a sequence and that are sequentially adjacent in the name-space of the set of selectable commands may be specified using an Incr command tag within the header. For example, when Cnt is 4 and Incr command tag is asserted, a sequential set of commands cmd0, cmd1, cmd2, and cmd3 is executed. A command that is often followed by a plurality of the same command may also be designed to be sequentially adjacent in the name-space of the set of selectable commands. A header may include an IncrOnce command tag that indicates a first command is followed by a plurality of one or more of the next sequential commands.

Figure 5A:
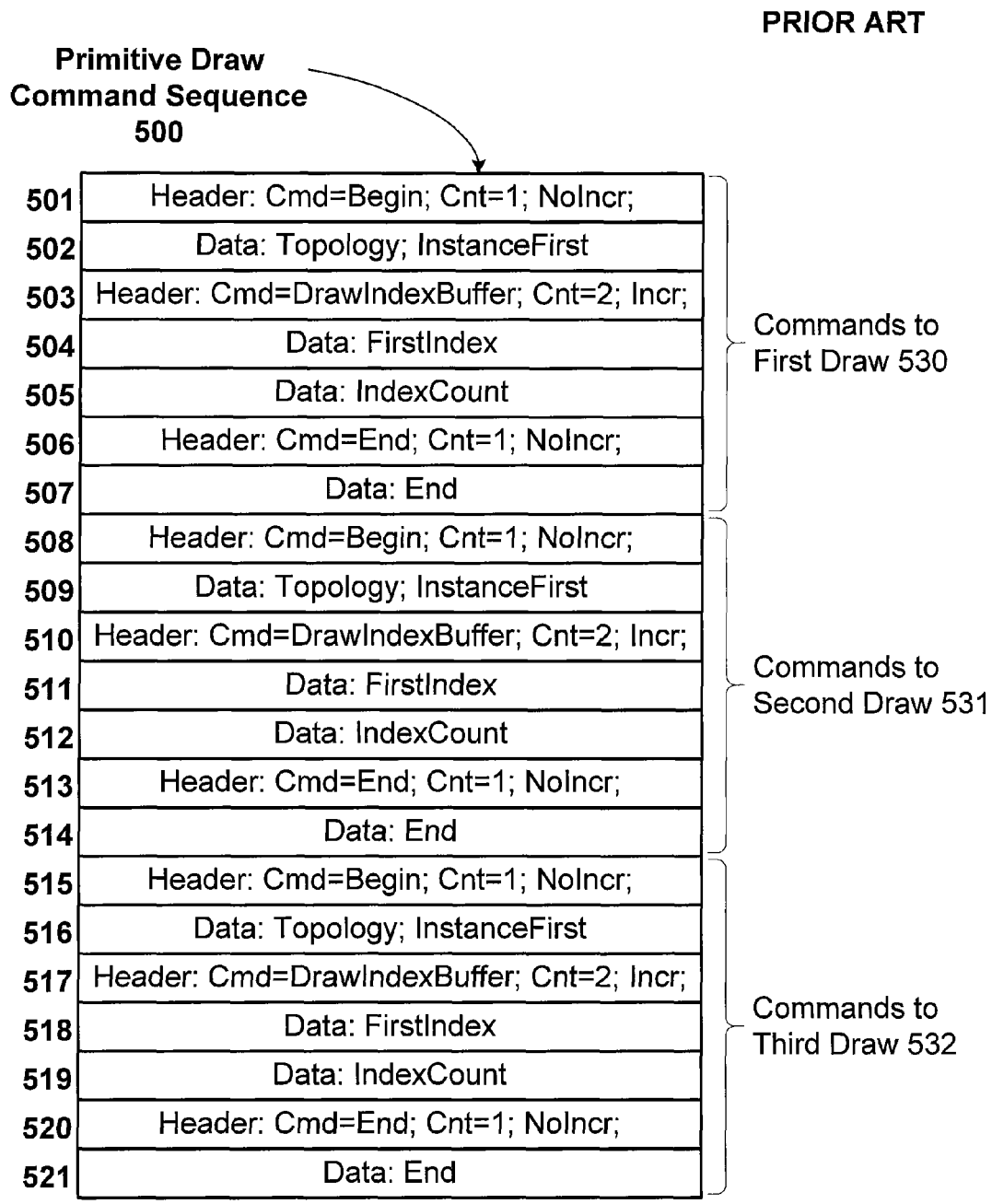
FIG. 5A is a diagram of a prior art primitive draw command sequence including an explicit begin draw command and an explicit end draw command.

The OpenGL API includes explicit API-visible begin and end commands for primitive draw command sequences. Conventionally, the begin command and the end command are each specified in separate headers, thereby being separate commands. Primitives to be rendered are placed between one or more pairs of begin and end commands in a sequence. FIG. 5A is a diagram of a prior art primitive draw command sequence 500 that includes an explicit begin command 501 and 502 and an explicit end command 506 and 507. A first 32-bit dword 501 is a header dword that specifies a begin command for a first set of primitives, the command Cnt, and the command tag NoIncr. The dword 501 is followed by: (a) the data dword 502 for the begin command, which selects the primitive topology for the first set of primitives, and an InstanceFirst tag; (b) the header dword 503 for the DrawIndexBuffer commands and the corresponding data dwords 504, 505; (c) the header dword 506 for the end command and the corresponding data dword 507. The sequence of commands between the header dword 501 that includes the begin command and data dword 507 corresponding to the end command are the commands to first draw 530.

The primitive topology indicates the type of primitives to be drawn, e.g., point, line, line loop, line strip, triangle, triangle strip, triangle fan, quadrilateral, quadrilateral strip, polygon, line list with adjacency, line strip with adjacency, triangle list with adjacency, triangle strip with adjacency, and a patch. In some embodiments, the header or the data also specify instancing information, i.e., whether the instance is the first instance (InstanceFirst) or a subsequent instance (InstanceSubsequent). The dword 502 specifies the InstanceFirst which indicates that a primitive identifier (ID) is cleared to zero for the first primitive drawn. When instance_subsequent is specified, the primitive ID is not cleared for the first primitive, but rather, incremented.

The data dwords 504 and 505 for the DrawIndexBuffer commands specify: (a) the FirstIndex, which is the offset location of the first index within an index buffer, and is used to find the first vertex used for drawing; and (b) the IndexCount, which is the number of indices to use for drawing. The index buffer is a memory area that stores a plurality of indices, each index specifying either an index or a primitive restart, and the DrawIndexBuffer commands cause a number of vertices to be drawn, where the number of indices and primitive restarts equal the IndexCount. Thus, seven dwords 501-507 are the commands to first draw 530 that specifies a first indexed draw. Seven more dwords 508-514 are the commands to a second draw 531 that specifies a second indexed draw, and seven more dwords 515-521 are the commands to third draw 532 that specifies a third indexed draw.

Figure 5B:
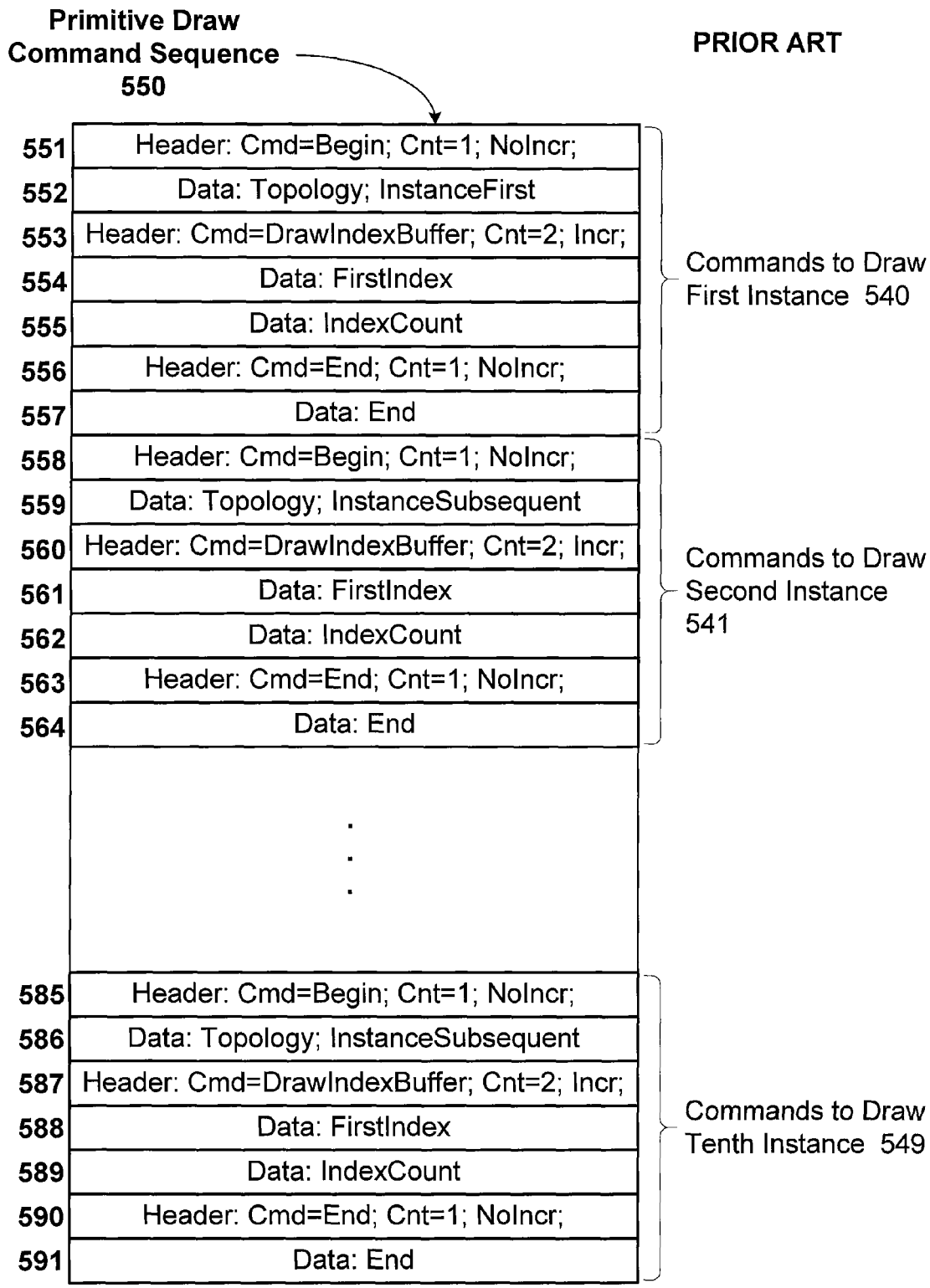
FIG. 5B is a diagram of another prior art primitive draw command sequence including an explicit begin command and an explicit end command.

FIG. 5B is a diagram of another prior art primitive draw command sequence 550 that also includes an explicit begin command and an explicit end command. While primitive draw command sequence 500 performed three indexed draws, the primitive draw command sequence 550 performs ten instanced indexed draws. A first header dword 551 specifies a begin command for a first set of primitives, the command Cnt, and the command tag NoIncr. The dword 551 is followed by: (a) the data dword 552 for the begin command, which selects the primitive topology for the first set of primitives, and an InstanceFirst tag; (b) the header dword 553 for the DrawIndexBuffer commands and the corresponding data dwords 554 and 555; (c) the header dword 556 for the end command and the corresponding data dword 557. The sequence of commands between the header dword 551 that includes the begin command and the data dword 557 following the end command are the commands to first draw the first instance 540.

Seven more dwords 558-564 are the commands to draw second instance 541 that specifies a second instance using the InstanceSubsequent tag (see dword 559). Additional third, fourth, fifth, sixth, seventh, eighth, and ninth instances are drawn that are followed by seven more dwords 585-591 that are the commands to draw tenth instance 549 that specifies a tenth instance using the InstanceSubsequent tag (see dword 586).

In the prior art primitive draw command sequence 500, twenty-one dwords are transmitted and processed for three indexed draws. In the prior art primitive draw command sequence 550, seventy dwords are transmitted and processed for drawing ten indexed instances. The present invention includes the innovation of commands including implicit begin and end semantics that reduce the number of dwords in command sequences.

The number of dwords that are transmitted and processed as overhead for each one of the indexed draws is four of the seven dwords (two header dwords and two data dwords). More clock cycles are consumed transmitting and processing overhead than are consumed transmitting and processing draw commands. As the number of primitives included in each draw increases, the overhead cycles are a small fraction in comparison with the overall number of clocks to draw all the primitives in a draw. However, for graphics application programs that have many draws each with a small set of primitives, the overhead cycles reduce the primitive draw performance of the graphics application program.

Figure 6A:
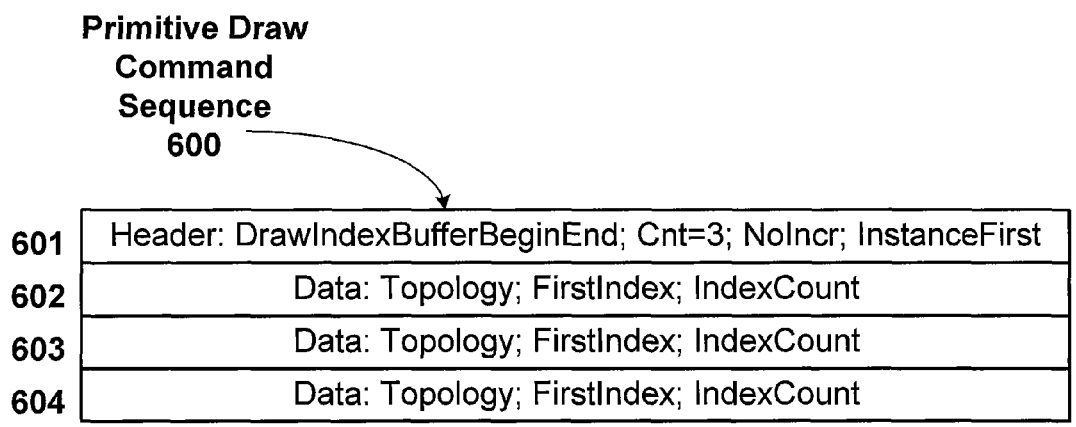
FIG. 6A is a diagram of a primitive draw command sequence including an implicit begin command and an implicit end command, according to one embodiment of the present invention.

FIG. 6A is a diagram of a primitive draw command sequence 600 including an implicit begin command and an implicit end command, according to one embodiment of the present invention. The primitive draw command sequence 600 includes a header dword 601 followed by three data dwords 602, 603, and 604. As described above, the command count of three and a NoIncr tag means three commands are executed and each is paired with a data dword 602, 603, 604, where each data dword includes specifying the primitive topology, the first index to be used, and the number of indices to be used. In this command sequence 600, each of the three commands includes the semantics of: (a) a begin that selects the primitive topology; (b) a draw using an index buffer, including the first index and the index count; and (c) an end. In some embodiments, the header or the data also specify whether the instance is the first instance or a subsequent instance.

Four dwords are transmitted and processed for three indexed draws in the primitive draw command sequence 600. Seventeen fewer dwords are needed in the in the primitive draw command sequence 600 compared with the primitive draw command sequence 500 that required twenty-one dwords. Command sequence 600 is significantly more efficient in terms of overall dwords needed to encode the commands compared with the primitive draw command sequence 500 with explicit begin and end commands.

Figure 6B:
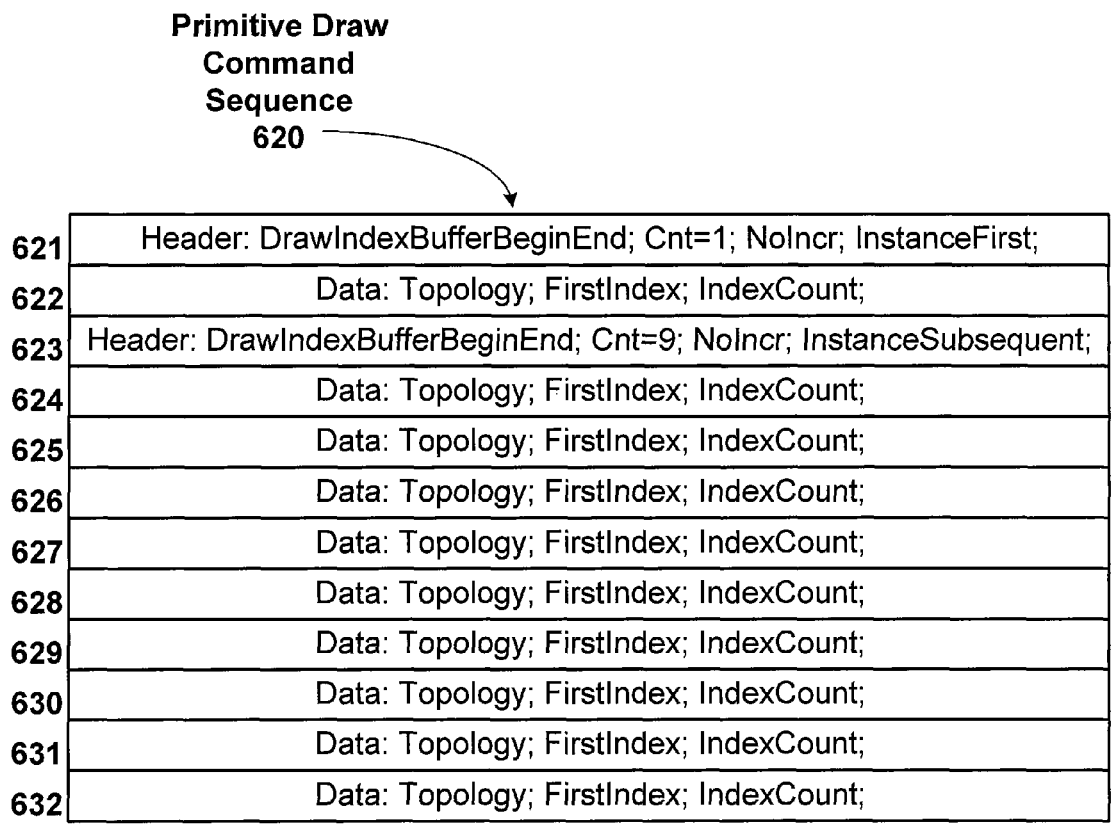
FIG. 6B is a diagram of another primitive draw command sequence including an implicit begin command and an implicit end command, according to one embodiment of the present invention.

FIG. 6B is a diagram of another primitive draw command sequence 620 including an implicit begin command and an implicit end command, according to one embodiment of the present invention. The primitive draw command sequence 620 is configured to draw ten primitives. The primitive draw command sequence 620 includes a first header dword 621 followed by a single data dword 622. As described above, the command Cnt of one and the InstanceFirst tag means the primitive ID is reset to zero. The dword 622 includes the primitive topology, the first index to be used, and the number of indices to be used.

A second header dword 623 is followed by nine dwords 624-632 to perform nine instanced draws, and the Instance-Subsequent tag means the primitive ID is incremented for each of the nine draws. The command Cnt of nine and a NoIncr tag means nine commands are executed and each is paired with a data dword 624, 625, 626, 627, 628, 629, 630, 631, and 632 where each data dword includes specifying the primitive topology, the first index to be used, and the number of indices to be used. In this command sequence 620, each of the ten commands includes the semantics of: (a) a begin that selects the primitive topology; (b) a draw using an index buffer, including the first index and the index count; and (c) an end. In some embodiments, the header or the data also specify whether the instance is the first instance or a subsequent index.

Twelve dwords are transmitted and processed for ten indexed draws in the primitive draw command sequence 620 compared with seventy dwords for the primitive draw command sequence 550 that also produces ten indexed draws. Seventy-eight fewer dwords are needed in the in the primitive draw command sequence 620 compared with the primitive draw command sequence 550. The number of dwords that are transmitted and processed as overhead is greatly reduced, making the primitive draw command sequence 620 including an implicit begin command and an implicit end command significantly more efficient in terms of overall dwords needed to encode the commands needed for drawing the ten instanced draws when compared with the primitive draw command sequence 550 with explicit begin and end commands.

Figure 6C:
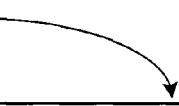
FIG. 6C is a diagram of yet another primitive draw command sequence including an implicit begin command and an implicit end command, according to one embodiment of the present invention.

FIG. 6C is a diagram of another primitive draw command sequence 640 encoded using an instance increment method that includes an implicit begin draw command and an implicit end draw command, according to one embodiment of the present invention. The primitive draw command sequence 640 is also configured to draw ten primitives. The primitive draw command sequence 640 includes one header dword 641 followed by ten data dwords 642-651. The command Cnt of ten and the InstanceFirst tag means the primitive ID is reset to zero and ten commands are executed. The IncrOnce indicates that a first command (cmd0) is followed by nine of the same command that is next in sequence (cmd1), where the next in sequence (cmd1) includes an InstanceSubsequent tag. The dwords 642-651 each include the primitive topology, the first index to be used, and the number of indices to be used for one of the ten primitives. The command sequence 640 is a further improvement over command sequence 620, because one less dword is needed.

The data dword of the conventional primitive draw command sequences 500 and 550 accommodate a greater number of bits for the FirstIndex and IndexCount fields compared with the header dwords for the primitive draw command sequences 600, 620, and 640. The data dword of the conventional primitive draw command sequences 500 and 550 uses separate data dwords to specify each of the Topology, FirstIndex, and IndexCount compared with the data dwords for the primitive draw command sequences 600, 620, and 640 that specify the Topology, FirstIndex, and IndexCount in a single dword. The topology requires 4 bits of a 32-bit dword, leaving 28 bits for the FirstIndex and IndexCount. In one embodiment, the IndexCount is encoded in 12 bits and the FirstIndex is encoded in 16 bits. The IndexCount and the FirstIndex are encoded in fewer bits when the innovative draw command method is used compared with the prior art technique of encoding a sequence of primitive draw commands. Consequently, the maximum values of the IndexCount and FirstIndex are lower for the draw command method DrawIndexBufferBeginEnd compared with the conventional DrawIndexBuffer. In one embodiment, when a draw requires an IndexCount or FirstIndex that exceeds the maximum value of the draw command method DrawIndexBufferBeginEnd, the draw primitive command may be encoded using the prior art technique.

For graphics application programs that have many small sets of primitives, the percentage of overhead cycles is significantly reduced using the more compact command encoding of the DrawIndexBufferBeginEnd method compared with the prior art technique. Therefore, the primitive draw performance of the graphics application program may be improved when the DrawIndexBufferBeginEnd method is used to increases due to the innovative encoding of the draw commands. Additionally, fetching of the indices for each primitive is initiated when a dword including the topology and the IndexCount and FirstIndex is processed. In contrast, the prior art technique does not initiate fetching of the indices for the primitives until the end command is processed.

Figure 7:
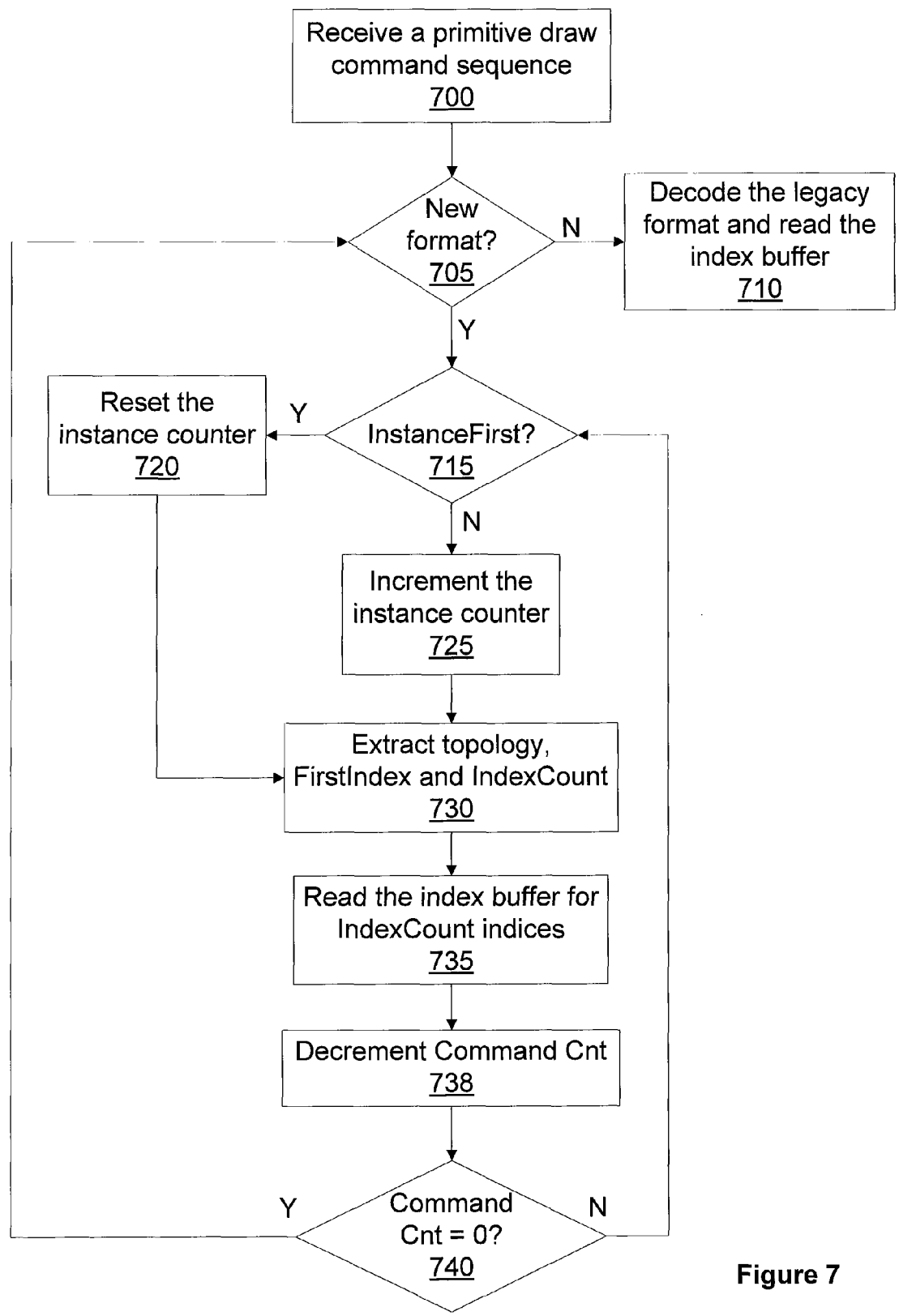
FIG. 7 is a flow diagram of method steps for processing a primitive draw command sequence including an implicit begin command and an implicit end command, according to one embodiment of the present invention.

FIG. 7 is a flow diagram of method steps for processing a primitive draw command sequence including an implicit begin command and an implicit end command, according to one embodiment of the present invention. At step 700 the front end 212 (see FIG. 2) receives a primitive draw command sequence. At step 705 the front end 212 determines if the first (header) dword in the primitive draw command sequence is encoded in the new format, i.e., using a method that includes an implicit begin command and an implicit end command, examples of which are shown in FIGS. 6A, 6B, and 6C. When the primitive draw command sequence is encoded using the legacy format with explicit begin and end draw commands as shown in FIGS. 5A and 5B, at step 710 the front end 212 decodes the legacy format and reads the index buffer.

When the primitive draw command sequence is encoded using the new format, at step 715 the front end 212 determines if the InstanceFirst mode is enabled, and, if so, at step 720 the instance counter that is used to generate the primitive ID is reset or cleared to zero. When the InstanceFirst mode is not enabled, the InstanceSubsequent mode is enabled and, at step 725 the instance counter is incremented to generate a different primitive ID. At step 730 the front end 212 has completed processing of the header dword and then begins processing of the first data dword by extract the topology, FirstIndex, and the IndexCount.

At step 735 the front end 212 reads the index buffer for an IndexCount number of indices to obtain a set of indices that is then used to read one or more vertex attribute buffers. The front end 212 then initiates rendering of the primitive using vertex data stored in the vertex attribute buffers. The addresses that are used to read the set of indices stored in the index buffer may be computed by the front end 212 using a base address of the index buffer, the number of bits of the indices stored in the index buffer, the extracted FirstIndex, and the extracted IndexCount. At step 738 the front end 212 decrements the command Cnt value (initialized using Cnt from the header dword). At step 740 the front end 212 determines if the command Cnt equals zero, indicating that all of the commands have been processed. When the command Cnt does not equal zero, then the front end 212 returns to step 715 to process the next data dword. Otherwise, the front end 212 returns to step 705 to determine the format of the next header dword.

Although the method steps are described in conjunction with the systems of FIGS. 1, 2, 3A, 3B, and 3C, persons skilled in the art will understand that any system configured to perform the method steps, in any order, is within the scope of the inventions.

By encoding a primitive draw command sequence using implicit begin and end commands the overhead for transmitting the sequence is reduced compared with using explicit begin and explicit end draw commands. Only a single clock cycle is consumed to transmit and process the header, which also includes the instancing information and may specify the number of bits used for each index. The performance of graphics application programs that have many small batches of geometry (as is typical of many workstation applications) may be improved since the overhead of transmitting and processing the explicit begin and explicit end draw commands is reduced.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for processing a sequence of primitive draw commands, comprising:
    determining that the sequence of primitive draw commands includes an implicit begin command and an implicit end command;
    extracting a primitive topology, a first index buffer parameter, and an index count parameter corresponding to a primitive from the sequence of primitive draw commands;
    reading a set of indices corresponding to the primitive from locations in an index buffer based on the first index buffer parameter and the index count parameter; and
    initiating rendering of the primitive using vertex data associated with the set of indices.

2. The method of claim 1, wherein a header data word in the primitive draw command sequence indicates the number of bits used for each index in the set of indices.

3. The method of claim 2, wherein the header data word is processed in a first clock cycle, a data word following the header data word that specifies the primitive topology is processed in a second clock cycle, and rendering of the primitive is initiated in a third clock cycle.

4. The method of claim 2, wherein addresses for the set of indices are computed using the first index buffer parameter, the index count parameter, and the number of bits used for each index in the set of indices.

5. The method of claim 1, wherein a header data word in the primitive draw command sequence indicates that primitive identifier should be set to zero for each new primitive following the header data word in the sequence of primitive draw commands.

6. The method of claim 1, wherein a header data word in the primitive draw command sequence indicates that primitive identifier should be incremented for each new primitive following the header data word in the sequence of primitive draw commands.

7. The method of claim 1, wherein the primitive topology indicates a type of primitive as a point, line, triangle, quadrilateral, or mesh.

8. The method of claim 1, wherein each index in the set of indices specifies a location of a vertex buffer that stores a portion of the vertex data.

9. A non-transitory computer-readable storage medium storing instructions that, when executed by a processor, process a sequence of primitive draw commands, by performing the steps of:
    determining that the sequence of primitive draw commands includes an implicit begin command and an implicit end command;
    extracting a primitive topology, a first index buffer parameter, and an index count parameter corresponding to a primitive from the sequence of primitive draw commands;
    reading a set of indices corresponding to the primitive from locations in an index buffer based on the first index buffer parameter and the index count parameter; and
    initiating rendering of the primitive using vertex data associated with the set of indices.

10. The non-transitory computer-readable storage medium of claim 9, wherein a header data word in the primitive draw command sequence indicates the number of bits used for each index in the set of indices.

11. The non-transitory computer-readable storage medium of claim 10, wherein the header data word is processed in a first clock cycle, a data word following the header data word that specifies the primitive topology is processed in a second clock cycle, and rendering of the primitive is initiated in a third clock cycle.

12. The non-transitory computer-readable storage medium of claim 10, wherein addresses for the set of indices are computed using the first index buffer parameter, the index count parameter, and the number of bits used for each index in the set of indices.

13. The non-transitory computer-readable storage medium of claim 9, wherein a header data word in the primitive draw command sequence indicates that primitive identifier should be set to zero for each new primitive following the header data word in the sequence of primitive draw commands.

14. The non-transitory computer-readable storage medium of claim 9, wherein a header data word in the primitive draw command sequence indicates that primitive identifier should be incremented for each new primitive following the header data word in the sequence of primitive draw commands.

15. A system for processing a sequence of primitive draw commands, the system comprising:
    a parallel processing unit comprising a front end configured to:

determine that the sequence of primitive draw commands includes an implicit begin command and an implicit end command;

extract a primitive topology, a first index buffer parameter, and an index count parameter corresponding to a primitive from the sequence of primitive draw commands;

read a set of indices corresponding to the primitive from locations in an index buffer based on the first index buffer parameter and the index count parameter; and initiate rendering of the primitive using vertex data associated with the set of indices.

16. The system of claim 15, wherein a header data word in the primitive draw command sequence indicates the number of bits used for each index in the set of indices.

17. The system of claim 16, wherein the header data word is processed in a first clock cycle, a data word following the header data word that specifies the primitive topology is processed in a second clock cycle, and rendering of the primitive is initiated in a third clock cycle.

18. The system of claim 16, wherein addresses for the set of indices are computed using the first index buffer parameter, the index count parameter, and the number of bits used for each index in the set of indices.

19. The system of claim 15, wherein a header data word in the primitive draw command sequence indicates that primitive identifier should be set to zero for each new primitive following the header data word in the sequence of primitive draw commands.

20. The system of claim 15, wherein a header data word in the primitive draw command sequence indicates that primitive identifier should be incremented for each new primitive following the header data word in the sequence of primitive draw commands.

* * * * *